UNITED STATES PATENT OFFICE.

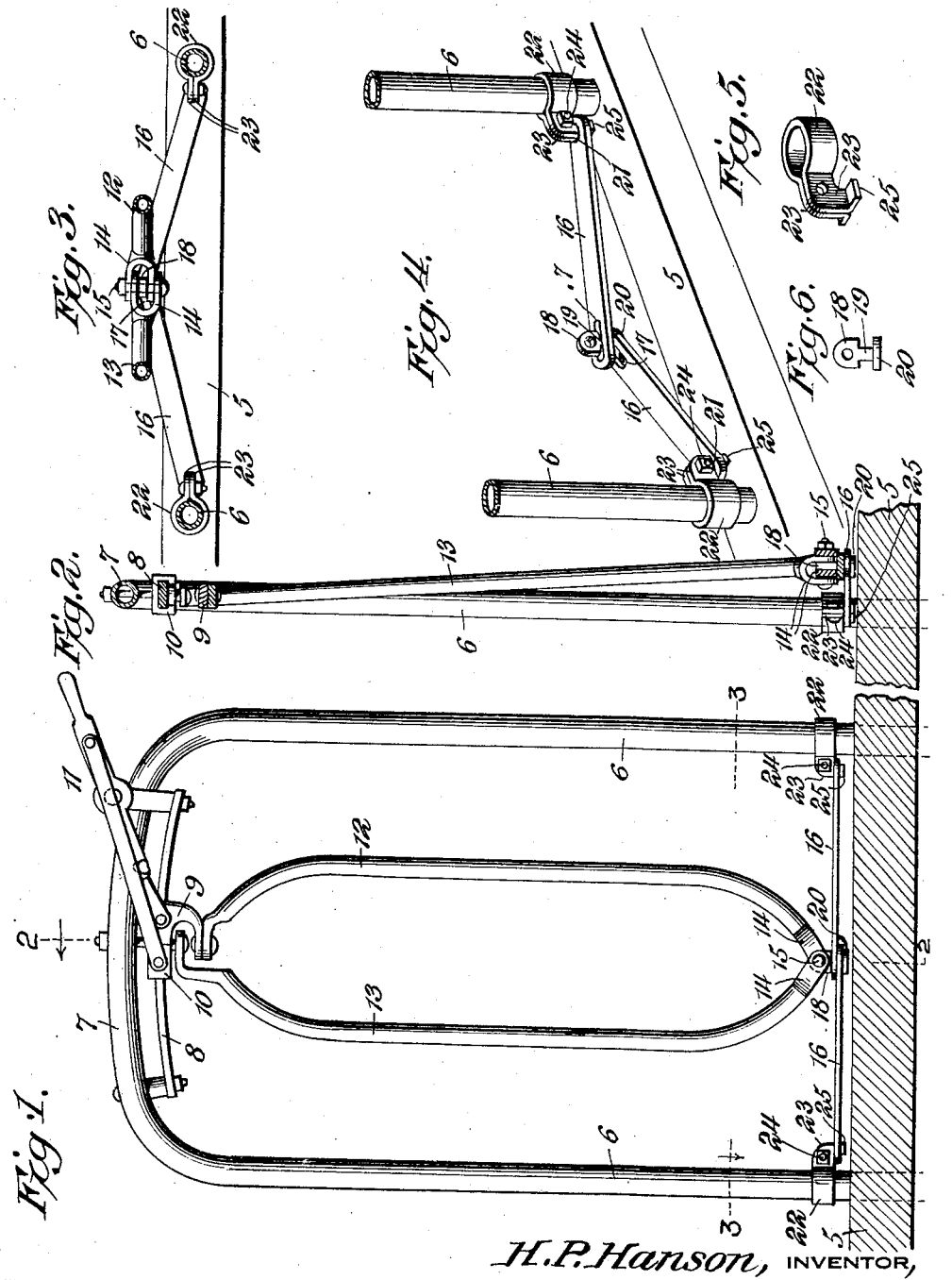

HAAKON P. HANSON, OF ALBERT LEA, MINNESOTA.

CATTLE-STANCHION.

1,360,941.  Specification of Letters Patent.  Patented Nov. 30, 1920.

Application filed May 8, 1920. Serial No. 379,812.

*To all whom it may concern:*

Be it known that I, HAAKON P. HANSON, a citizen of the United States, residing at Albert Lea, in the county of Freeborn and State of Minnesota, have invented a new and useful Cattle-Stanchion, of which the following is a specification.

This invention relates to improvements in cattle stanchions.

The object of the invention is to dispense with the usual chains which connect the lower end of the stanchion to the stall members, said chains being objectionable because they are noisy, because they are only as strong as the weakest link and therefore readily break, and because of the comparatively high expense of manufacturing the same.

To accomplish this object, I provide two swivelly mounted links or bars connected at their outer ends to the stall frame and at their inner ends to each other and to the stanchion at the lower end thereof. By this construction of the present invention, I save two-thirds of the expense of the chains and at the same time eliminate all noise and avoid possibility of breakage.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is an elevation of a stall frame and stanchion member with the invention in place.

Fig. 2 is a section on the line 2—2 of Fig. 1.

Fig. 3 is a section on the line 3—3 of Fig. 1.

Fig. 4 is a perspective view of the links applied to the stall shown in one extreme position of their swing.

Fig. 5 is a detail perspective view of the collar or clamp which supports the outer end of each link.

Fig. 6 is an elevation of the element which connects the inner ends of the links with the pivot element of the stanchion.

The numeral 5 indicates a floor or the like supporting a stall including posts 6 and an upper crosspiece 7. A guiding bar 8 is provided for sliding the slides 9 and 10 connected with linkage represented generally by the numeral 11, which, being described and claimed in a co-pending application Serial No. 270,017, is not described in detail here. This linkage is provided for the purpose of moving the slides 9 and 10 along the guiding bar 8, whereby the upper ends of the stanchion members 12 and 13 are separated or moved together. The upper ends of these stanchion members are swiveled upon the lower ends of the slides 9 and 10, and when the stanchion is in closed position the swivels are in vertical alinement as shown in Fig. 1.

The lower ends of the stanchion members each have spaced ears 14 and they are pivotally connected to each other by a bolt or similar element 15 passing through matching perforations provided on the ear. The construction so far described has all been covered in the co-pending application referred to.

The device of the present invention comprises the parts about to be described. A pair of links 16 in the form of flat bars are provided with slots or perforations 17 at one end. These slots 17 may be somewhat elongated, as shown, to allow for the tendency to separate on the part of the links when the stanchion is swung. A connecting member having a head 18 provided with a hole therein, a neck 19, and an enlarged collar 20, is provided to connect the pivotal element 17 of the stanchion with the inner ends of these two links. The head 18 is passed through the slots 17 with one link 16 above the other, as seen in Fig. 4, and the pivotal element 15 is passed through the hole in the head 18. Thus the stanchion supports the inner ends of the links 16.

Clamps 22, adjustable on the posts 6, are provided to support the outer ends of the bars or links 16. These clamps each have depending arms 23 provided with matching holes and a bolt 24 is passed through these holes to hold the clamp in the desired position on the post. The outer ends of arms 23 are flared outwardly as indicated at 25, these flared-out ends providing means by which the clamps support the outer ends of the link.

Each link has a perforation 21 at its outer end within which the arms 23 are adapted to fit so that each link is swingably mounted or swiveled upon the respective clamp. The links 16 thus are capable of swinging movement in a horizontal plane.

It will be clear from the foregoing description that the two links have swivel connections with the post at one end and with the stanchion members at the other end, and are further connected to each other. The stanchion depends upon the slides and imposes no weight whatever upon the links, but on the other hand supports the links off the floor. The links permit free swinging movement of the stanchion inwardly or outwardly with respect to the stall to a limited extent, this movement being dependent principally upon the length of slots 17. The construction is such that when the stanchion is swung, there will be no noise whatever and the two links are very much stronger than the chains customarily used for the same purpose, besides being extremely cheap to manufacture.

What is claimed is:—

1. In a cattle stanchion, a stall frame, stanchion members pivotally connected at their lower ends and mounted upon the frame, said frame including a pair of posts, a clamp secured to each post near its base, said clamps having depending arms provided with flared ends, a pair of links each having a slot at one end and a perforation at the other end and each swiveled at the perforated end on the depending arms of one of the clamps, and means for pivoting the lower ends of the stanchion members and engaging with the slotted ends of the links, whereby the stanchion may swing between the posts inwardly or outwardly of the stall.

2. In a cattle stanchion, a stall frame including a pair of posts, stanchion members pivotally connected at their lower ends and depending from the frame, a clamp secured to each post near its base, said clamps having depending arms provided with flared ends, a pair of links each having a slot at one end and a perforation at the other end and each swiveled at the perforated end on the depending arms of one clamp, a connecting member for the slotted ends of the links and the lower ends of the stanchion members, said connecting member including a head connected with the pivot of the stanchion members, a neck passed through the slots in the inner ends of the links, and a collar supporting the links on the neck.

3. A cattle stanchion, a stall frame including a pair of posts, a pair of pivoted stanchion members, a pair of links disposed substantially in a horizontal plane, means for pivotally connecting the outer ends of the links to the posts, the inner ends of the links having slots and adapted to overlap each other, a connecting member for the inner ends of the links and the lower ends of the stanchion members, said connecting member working in the slots of the links, and means for pivotally connecting the lower ends of the stanchion members to said connecting member, whereby the links work in a horizontal plane back and forth in response to the movements of said stanchion members.

4. In a cattle stanchion, a stall frame including a pair of posts, a pair of pivoted stanchion members, a pair of links in the form of flat bars arranged in a substantially horizontal position, a clamp mounted on each post and pivotally connected to and supporting the outer ends of the links, and a connecting member between the inner ends of the links and the lower ends of the stanchion members, said connecting member serving the double purpose of pivotally connecting the inner ends of the links to each other and pivotally connecting the lower ends of the stanchion members to said links, whereby the inner ends of the links are supported.

In testimony, that I claim the foregoing as my own, I have hereto affixed my signature.

HAAKON P. HANSON.